United States Patent [19]

Sundström

[11] 4,252,563

[45] Feb. 24, 1981

[54] PROCESS FOR THE FUMING TREATMENT OF METALLURGICAL SLAG

[75] Inventor: Eric O. A. Sundström, Skellefteå, Sweden

[73] Assignee: Boiden Aktiebolag, Stokholm, Sweden

[21] Appl. No.: 714,506

[22] Filed: Aug. 16, 1976

[30] Foreign Application Priority Data

Aug. 25, 1975 [SE] Sweden ............................. 7509430

[51] Int. Cl.³ ...................... C22B 13/00; C22B 17/00; C22B 19/10; C22B 25/00
[52] U.S. Cl. ........................................... 75/71; 75/24; 75/77; 75/85; 75/88; 75/84
[58] Field of Search ................... 75/24, 77, 88, 25, 71, 75/85; 423/107, 108, 623

[56] References Cited

U.S. PATENT DOCUMENTS

| | | | |
|---|---|---|---|
| 3,891,428 | 6/1975 | Yordanov et al. | 75/24 |
| 3,892,559 | 7/1975 | Quarm | 75/87 |

FOREIGN PATENT DOCUMENTS 237325  1/1962  Australia ................................. 75/1 R

*Primary Examiner*—M. J. Andrews
*Attorney, Agent, or Firm*—Stevens, Davis, Miller & Mosher

[57] ABSTRACT

A continuous process for the fuming treatment of metallurgical slag, e.g. lead and copper smelting furnace slag. Passing the slag continuously through consecutive slag treatment zones of a fuming furnace, subjecting it in a first one of said zones to heating to fume off comparatively volatile, preferably sulphide-bound constituents thereof, subjecting it in a second one of said zones to reduction to reduce preferably oxide-bound constituents and fuming off said last mentioned constituents in an elementary form and adjusting the temperature of the slag in said first zone such that the reduction treatment in said second zone is accomplishable substantially without further heating the slag.

12 Claims, No Drawings

PROCESS FOR THE FUMING TREATMENT OF METALLURGICAL SLAG

The present invention relates to a continuous process for the fuming treatment of metallurgical slag, e.g. lead and copper smelting furnace slag, for the purpose of recovering valuable metals in the slag, such as zinc, lead, tin, cadmium and germanium.

Metallurgical slags are most often of the silicate type, i.e. they contain silica as a substantial component. The less valuable constituents from the original charge are also usually collected in these slags, e.g. its content of gangue which may contain CaO, MgO, $Al_2O_3$ and $SiO_2$. In non-ferrous metallurgy the slags often contain a large amount of the iron of the original charge in the form of oxides, primarily FeO but also magnetite. Apart from the slag components mentioned above there are often valuable and recoverable constituents in metallurgical slags, this being at least partly due to the fact that primarily the silicates in certain acidic or neutral slags have the ability of taking up metals present in oxidic form. Larger amounts of zinc can thus be dissolved oxidically in iron silicate slags, for example.

Certain sulphides may also be dissolved in slags, preferably at high slag temperatures. These sulphides dissolved in slag can in turn dissolve other sulphides secondarily, which latter sulphides primarily have lower solubility. It may be mentioned here that $Cu_2S$ and PbS, for example, can be dissolved secondarily in ZnS or FeS, which primarily has been dissolved in slag.

So-called mechanical metal losses to the slag can occur with low slag temperatures or with high slag viscosity, due to incomplete separation of slag and the product, e.g. mattes, striven for in the metallurgical process.

One of the most economical methods of recovering valuable constituents from slags is one generally known as slag-fuming.

Slag-fuming is generally carried out batch-wise in furnaces, each furnace cycle usually being divided into three periods, viz. charging, fuming and tapping. Fuel, usually in the form of pulverized coal, and air is blown into and through the slag during the charging period via tuyeres which are usually placed horizontally in the furnace walls, the relationship between fuel and air being selected so that the ingoing coal is substantially combusted to $CO_2$. Heat is hereby supplied to the furnace and the temperature of the charged slag rises.

During the fuming period the fuel supply is increased in relation to the air supply, usually so that only a part of the C present in the fuel is oxidised, and then primarily the CO only. Under the reducing action of the atmosphere in the slag caused by C and CO, oxides of metals predominantly of metals more precious than iron, are reduced to metals, which at the temperatures in question have a high partial pressure and therefore accompany outgoing furnace gases. The metals are subsequently recovered from these gases by reoxidation and separation of solid oxides formed. Since the temperature of the slag decreases during this period of the furnace cycle, the relation between air and fuel supply must once again be changed on approaching and during the last period, i.e. the tapping period, so that the slag temperature increases for facilitating tapping and also an obtional subsequent separation process, in which remaining sulphides in the treated slag are separated.

A plant for batch-wise or discontinuous slag fuming is described in the "Journal of Metals," June 1969, pages 1–8, for example.

In modern metallurgy there are attempts to turn from discontinuous to continuous processes, if possible. There are many reasons for these attempts, but they are primarily motivated by the increased demands for integrated process systems, automation, productivity and working hygiene. These conditions also apply to the slag fuming process, where a discontinuous method has many drawbacks in these respects. For instance, it can be mentioned that charging and tapping times reach about 30% of the total time for treating a charge, i.e. of the whole furnace cycle. Furthermore, the heat load on the furnace will be very uneven with alternating warmer and colder periods, in turn negatively affecting the life of the fuming furnace. It may also be mentioned that steam boilers connected to discontinuous slag fuming formers will have a periodically varying steam production, which naturally creates certain complications in an integrated steam system.

Processes for continuous treatment of slag have been previously proposed. Attempts have thereby been made of continuously treating slags containing non-ferrous metals in special shaft furnaces. It has been found impossible to operate such processes on an industrial scale. In the British patent specification 1 169 904 (Jordanov et al), however, there is described a slag fuming process in which molten slag containing recoverable non-ferrous metals is continuously tapped from a shaft furnace into a separate settler where the slag temperature is raised by about 100° C., the slag being continuously tapped off from the settler to a fuming furnace, and air and carbonaceous material being continuously passed to the fuming furnace and blown through the slag, whereafter the slag is continuously tapped from the fuming furnace. The above described method has been used in a plant at Plovdiv in Bulgaria since 1965.

In the last-mentioned plant, slag containing i.a. about 13% by weight Zn is treated. After fuming the slag contains about 2–2,5% by weight Zn, which is equivalent to a zinc yield of only about 80–85%. High yield of zinc is however an economical pre-requisite for slag fuming, which means that the discontinuous processes which easily achieve a zinc yield of 90% and more, have so far been superior with regard to yield. It has also been found that fuel economy for the continuous process described is considerably poorer than in discontinuous processes. A further inconvenience with such a procedure is that easy-volatilized components of the slag, e.g. certain sulphides, are to a large extent expelled out of the slag at the heating in the settling pool. This means that—if special measures are not taken for transportation of the volatilized sulphides out of the furnace, for instance by a powerful through-flow of an inert carrier gas in the furnace in a manner such as not to disturb the settling process, such through-flow, in its turn, requiring the arrangement of suitable inlet and outlet means for the carrier gas and possibly a separate gas cleaning system—the sulphides expelled out of the slag, possibly oxidized to sulphates, basic sulphates, or even oxides, will cause severe incrustions on the furnace walls and in the gas conducting means and furthermore reduced yields of the process.

It has now been surprisingly found that the said drawbacks in continuous slag fuming can be circumvented and furthermore larger throughout can be obtained than in a corresponding discontinuous furnace, if the slag is fumed according to a process which is characterized in that the slag, during continuous passage through a fuming furnace having consecutive slag treatment zones, in a first furnace zone is subjected to heat treatment for fuming off comparatively volatile, preferably sulphide-bound constituents thereof, and in a subsequent second furnace zone is subjected to reduction treatment for reducing preferably oxide-bound constituents, and fuming off these in elementary form, the temperature of the slag in the first furnace zone being adjusted so that the reduction treatment in the second furnace zone can be carried out substantially without further heating of the slag.

If the slag is to be subjected to further separation processes after the fuming treatment, it can be subjected to further heating in a third furnace zone, and which has been found essential in connection with copper smelting furnace slag for a subsequent copper recovery from the slag is a fourth furnace zone be subjected to reduction of its magnetite content before it is tapped from the furnace.

In the process in accordance with the invention, the heating operations, for instance, can thus be performed without any inconvenience at all, since the total amount of furnace gas, which gas is substantially inert in relation to sulphides, can be used as a carrier gas for transporting out of the furnace volatilized sulphides as well as products volatilized at reduction treatments. Furthermore, the collected furnace gas can be treated in one single gas cleaning and metal recovery system. The outlet for the furnace gases is consequently preferably placed at or adjacent said first zone of the furnace, whereby furthermore any significant unintensional oxidation of the volatilized slag components is avoided in the furnace.

The furnace zones can merge directly into each other without any mechanical boundary between them, although the oxygen and fuel supply to each furnace zone differs from the oxygen and fuel supply to adjacent furnace zone or zones. Since, especially in comparatively short furnaces, troublesome longitudinal mixing of untreated, partially treated and completely treated slag is difficult to avoid, the furnace can suitably be provided with intermediate walls or thresholds transverse to the through-flow direction of the slag to partially separate the slag volumes in the different treatment zones, thereby preventing or inhibiting longitudinal slag flow of an undesirable nature. These intermediate walls can be made in a plurality of different ways, and they can be cooled or uncooled. They can furthermore be impermeable or provided with through-flow openings of different sizes and shapes and can, for example, be made as gratings.

To enable better utilization of reduction agents and fuel in slag fuming, the fuming period itself can be divided into several sub-periods, during which the air/fuel ratios are optimated with regard to the variation of the slag composition during the fuming period. For instance, in certain cases it can be advantageous to use more strongly reducing conditions the further the reduction treatment continues. Such subdivision of the fuming period and possibly, in as far as is desirable, other treatment periods as well is enabled in the process according to the invention by dividing up the said second furnace zone and other furnace zones into at least two partial zones, which can thereby also be separated by individual temperature adjusting zones. Intermediate walls of the kind described above separating the partial zones and also separating these and the temperature adjusting zones can thereby further improve the efficiency. Furthermore, the use of oxygen gas or an air/oxygen gas mixture in a suitable zone can improve the possibilities of smelting cold slag charged into the zone in question.

To carry out the heat treatment and the reduction treatment of the slag, solid, liquid or gaseous fuel together with oxygen containing gas is introduced, preferably adjacent the furnace bottom, into the slag in each of the different zones and partial zones, respectively. Pulverized coal is preferably used as the solid fuel, and can be produced by grinding slack or other lowgrade coal qualities in a milling plant adjoining the furnace plant. To advantage, the furnace may also be supplied with liquid fuels, preferably liquid petroleum products. It is extremely advantageous to use fuel oil, since it is easy to transport to the furnace and is furthermore easy to introduce therein at a desired constant flow. It is also possible to use both fuel oil and pulverized coal, which can be an advantage, since in certain cases fuel oil has been found to be less suitable from the point of view of fuming efficiency. In such cases pulverized coal can preferably be supplied to the reduction zones, while fuel oil is used solely as fuel in the process and is suitably supplied to the heating zones.

The advantages of the process according to the invention are illustrated by the following examples:

A furnace for continuous slag fuming in accordance with a preferred embodiment of the invention is continuously supplied with 38 tons of molten slag per hour. The slag which is of the fayalite type contains, inter alia, 11% by weight Zn. By means of threshold-like intermediate walls controlling the slag flow through the furnace, the latter is partially divided up into three zones, respectively comprising 27.8%, 55.5% and 16.7%. of the furnace volume. About 2400 kg pulverized coal together with about 21500 $m^3$ air (calculated at normal conditions, i.e. mm Hg and 20° C.), preheated to about 300° C., are supplied to the first zone per hour, whereat the combustion gas will essentially comprise carbon dioxide and nitrogen, and the slag temperature increase by about 100° C. 3250 kg of pulverized coal and about 13500 $m^3$ of air, preheated to about 300° C., are supplied per hour to the second zone. The same amount of coal and air is supplied to the third furnace zone as to the first furnace zone, whereby the slag temperature, which has dropped when passing the second furnace zone, is once again raised. The outgoing slag has a zinc content of 1.2% by weight.

For discontinuous slag fuming carried out on the same type of slag in the same furnace, although without any division into zones and intended to reach the same outgoing zinc content as in the continuous slag fuming just described as an example, the throughput of slag during the furnace cycle will only be about 90% of that with continuous fuming.

Obtaining the same zinc yield in the discontinuous process as in the continuous one thus requires longer times per furnace cycle, which in turn means that the throughput in the discontinuous process will be lower. In actual fact, the throughput in a discontinuous process will be further reduced because for practical reasons the furnace cycles cannot follow immediately after each other without a certain amount of intermediate rigging time.

I claim:

1. A continuous process for the fuming treatment of metallurgical slag, comprising as slag components one or more oxides selected from a first group consisting of CaO, MgO, $Al_2O_3$, $SiO_2$, FeO and $Fe_3O_4$ and further comprising one or more recoverable metals selected from a second group consisting of zinc, lead, tin, cadmium and germanium in sulfide, oxide or sulfide and oxide bound form, the process comprising the steps of continuously introducing the slag in a molten state to a fuming furnace having consecutive slag treatment zones, causing the slag to continuously pass through said furnace zones and out of the furnace, subjecting the slag, in a first furnace zone to a heat treatment in an atmosphere substantially inert to sulfides by means of supplying fuel and oxygen to the slag so that sulfide-bound recoverable metals from said second group are fumed off in substantially sulfidic state and recovered, subjecting the slag in a subsequent second furnace zone to a reduction treatment by means of supplying fuel and oxygen to the slag so as to reduce the oxide bound recoverable metals of said second group and to fume off these in elementary form and recover them by reoxidation and separation of solid oxides formed thereby, the temperature of the slag in the first furnace zone being adjusted by the heat treatment so that the reduction treatment in the second furnace zone can be carried out substantially without further heating the slag.

2. Process as claimed in claim 1, wherein the slag is once again subjected to heat treatment in a third furnace zone following the second furnace zone.

3. Process as claimed in claim 2, wherein the treated slag is subjected to reduction treatment in a fourth furnace zone before it is tapped from the furnace.

4. Process as claimed in claim 1, wherein the individual zones are partly separated by intermediate walls for controlling the longitudinal slag flow in the furnace.

5. Process as claimed in claim 1, wherein the second furnace zone is subdivided into at least two partial zones.

6. Process as claimed in claim 5, wherein the partial zones are separated by temperature adjusting zones.

7. Process as claimed in claim 5, wherein the partial zones are separated from each other or from the temperature adjusting zones by means of intermediate walls.

8. Process as claimed in claim 1, wherein the fuming treatment is carried out by introducing solid, liquid or gaseous fuel and oxygen-containing gas to the slag in the different zones.

9. Process as claimed in claim 8, wherein pulverized coal is used as fuel.

10. Process as claimed in claim 8, wherein a liquid petroleum product is used as fuel.

11. Process as claimed in claim 10, wherein the liquid petroleum product is fuel oil.

12. Process as claimed in claim 8, wherein both fuel oil and pulverized coal are used as fuel.

* * * * *